US012112709B2

(12) United States Patent
Lu et al.

(10) Patent No.: US 12,112,709 B2

(45) Date of Patent: Oct. 8, 2024

(54) METHOD OF CONTROLLING DISPLAY PANEL WITH VIDEO DATA TRANSMITTED THROUGH EDP/DP INTERFACE AND RELATED CONTROL CIRCUIT

(71) Applicant: NOVATEK Microelectronics Corp., Hsin-Chu (TW)

(72) Inventors: Yu-Tsung Lu, Hsinchu County (TW); Chih-Cheng Chuang, Tainan (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 35 days.

(21) Appl. No.: 18/080,748

(22) Filed: Dec. 14, 2022

(65) Prior Publication Data

US 2024/0203362 A1 Jun. 20, 2024

(51) Int. Cl.

| | |
|---|---|
| ***G09G 3/30*** | (2006.01) |
| ***G09G 3/20*** | (2006.01) |
| ***G09G 3/3275*** | (2016.01) |
| ***G09G 3/36*** | (2006.01) |

(52) U.S. Cl.

CPC ......... *G09G 3/3275* (2013.01); *G09G 3/2096* (2013.01); *G09G 2310/0291* (2013.01); *G09G 2310/0297* (2013.01); *G09G 2310/08* (2013.01); *G09G 2370/14* (2013.01); *G09G 2370/22* (2013.01)

(58) Field of Classification Search

CPC ............... G09G 3/2096; G09G 3/3275; G09G 2310/0291; G09G 2310/0297; G09G 2310/08; G09G 2370/14; G09G 2370/022

See application file for complete search history.

(56) References Cited

U.S. PATENT DOCUMENTS

| | | | | |
|---|---|---|---|---|
| 11,289,029 | B1 * | 3/2022 | Sung | G09G 3/3208 |
| 2013/0027379 | A1 * | 1/2013 | Lee | G09G 3/3618 345/212 |
| 2017/0004766 | A1 * | 1/2017 | Cho | G06F 1/1652 |
| 2021/0005130 | A1 * | 1/2021 | Roh | G09G 5/393 |

FOREIGN PATENT DOCUMENTS

| | | | |
|---|---|---|---|
| CN | 111462704 | A | 7/2020 |
| CN | 115223475 | A | 10/2022 |

* cited by examiner

*Primary Examiner* — Sanghyuk Park

(74) *Attorney, Agent, or Firm* — Winston Hsu

(57) ABSTRACT

A method used for a control circuit for controlling a display panel includes steps of: determining whether there is an input video data received at a predetermined time; outputting an output video data and a clock signal having a first frequency to the display panel when determining that there is an input video data received at the predetermined time; and stopping outputting the output video data but outputting the clock signal having a second frequency to the display panel when determining that there is no input video data received at the predetermined time. Wherein, the second frequency is higher than the first frequency.

36 Claims, 11 Drawing Sheets

METHOD OF CONTROLLING DISPLAY PANEL WITH VIDEO DATA TRANSMITTED THROUGH EDP/DP INTERFACE AND RELATED CONTROL CIRCUIT

BACKGROUND OF THE INVENTION

1. Field of the Invention

The present invention relates to a method of controlling a display panel and a related control circuit, and more particularly, to a method of controlling a light-emitting diode (LED) panel by receiving input video data through the display port (DP) or embedded display port (eDP) interface and a related control circuit.

2. Description of the Prior Art

In the embedded display port (eDP) or display port (DP) (abbreviated as eDP/DP hereinafter) interface, there is no vertical synchronization signal in its protocol, as different from the mainstream mobile industry processor interface (MIPI). After the previous frame data is completely transmitted, the video provider may start to transmit the next frame data to the display driver circuit at any time point; hence, the display driver circuit should be synchronous to the video provider at any time point based on the reception of video data.

In the conventional liquid crystal display (LCD) panel, the backlight may be always-on. Therefore, when the video data through the eDP/DP interface arrives irregularly, the display driver circuit may delay the video data correspondingly and then refresh the panel with the video data at a predetermined time, so that the video data may be well synchronized and may not be affected by irregular transmission in the eDP/DP interface.

As for an organic light-emitting diode (OLED) panel, the light emission is generated by using OLEDs of the pixels rather than the backlight module, where the emissions of OLEDs are controlled by emission pulse signals, and the brightness is determined based on the duty cycle of the emission pulse signals. However, when the eDP/DP interface is applied to transmit the video data, the display driver circuit should be equipped with enough line buffers or frame buffers (e.g., static random access memory (SRAM)) to queue the video data, in order to keep the correct emission duty when refreshing the panel with the video data.

Therefore, when an OLED panel is operated with the eDP/DP interface for video data transmission, it is necessary to deploy enough line buffers or frame buffers to satisfy the above control requirements. The required line/frame buffers occupy a large area, thereby increasing the circuit costs.

SUMMARY OF THE INVENTION

It is therefore an objective of the present invention to provide a method of controlling a light-emitting diode (LED) panel, in order to solve the abovementioned problems.

An embodiment of the present invention discloses a method used for a control circuit, for controlling a display panel. The method comprises steps of: determining whether there is an input video data received at a predetermined time; outputting an output video data and a clock signal having a first frequency to the display panel when determining that there is an input video data received at the predetermined time; and stopping outputting the output video data but outputting the clock signal having a second frequency to the display panel when determining that there is no input video data received at the predetermined time. Wherein, the second frequency is higher than the first frequency.

Another embodiment of the present invention discloses a control circuit for controlling a display panel. The control circuit comprises a detection circuit, a data output driver and an emission control circuit. The detection circuit is configured to determine whether there is an input video data received at a predetermined time. The data output driver, coupled to the detection circuit, is configured to output an output video data to the display panel when the detection circuit determines that there is an input video data received at the predetermined time, and stop outputting the output video data when the detection circuit determines that there is no input video data received at the predetermined time. The emission control circuit, coupled to the detection circuit, is configured to output a clock signal having a first frequency to the display panel when the detection circuit determines that there is an input video data received at the predetermined time, and output the clock signal having a second frequency to the display panel when the detection circuit determines that there is no input video data received at the predetermined time. Wherein, the second frequency is higher than the first frequency.

Another embodiment of the present invention discloses a method used for a control circuit, for controlling a display panel. The method comprises steps of: receiving a first frame of video data; outputting the first frame of video data with an emission pulse signal having a first duty cycle to the display panel; determining whether a second frame of video data is received at a predetermined time after the first frame of video data is completely received; and outputting the emission pulse signal having the first duty cycle to the display panel without outputting any video data when determining that the second frame of video data is not received at the predetermined time.

Another embodiment of the present invention discloses a control circuit for controlling a display panel. The control circuit comprises a detection circuit, a data output driver and an emission control circuit. The detection circuit is configured to receive a first frame of video data and determine whether a second frame of video data is received at a predetermined time after the first frame of video data is completely received. The data output driver, coupled to the detection circuit, is configured to output the first frame of video data to the display panel. The emission control circuit, coupled to the detection circuit, is configured to output an emission pulse signal having a first duty cycle to the display panel. Wherein, the emission control circuit is further configured to output the emission pulse signal having the first duty cycle and the data output driver is further configured to not output any video data when the detection circuit determines that the second frame of video data is not received at the predetermined time.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
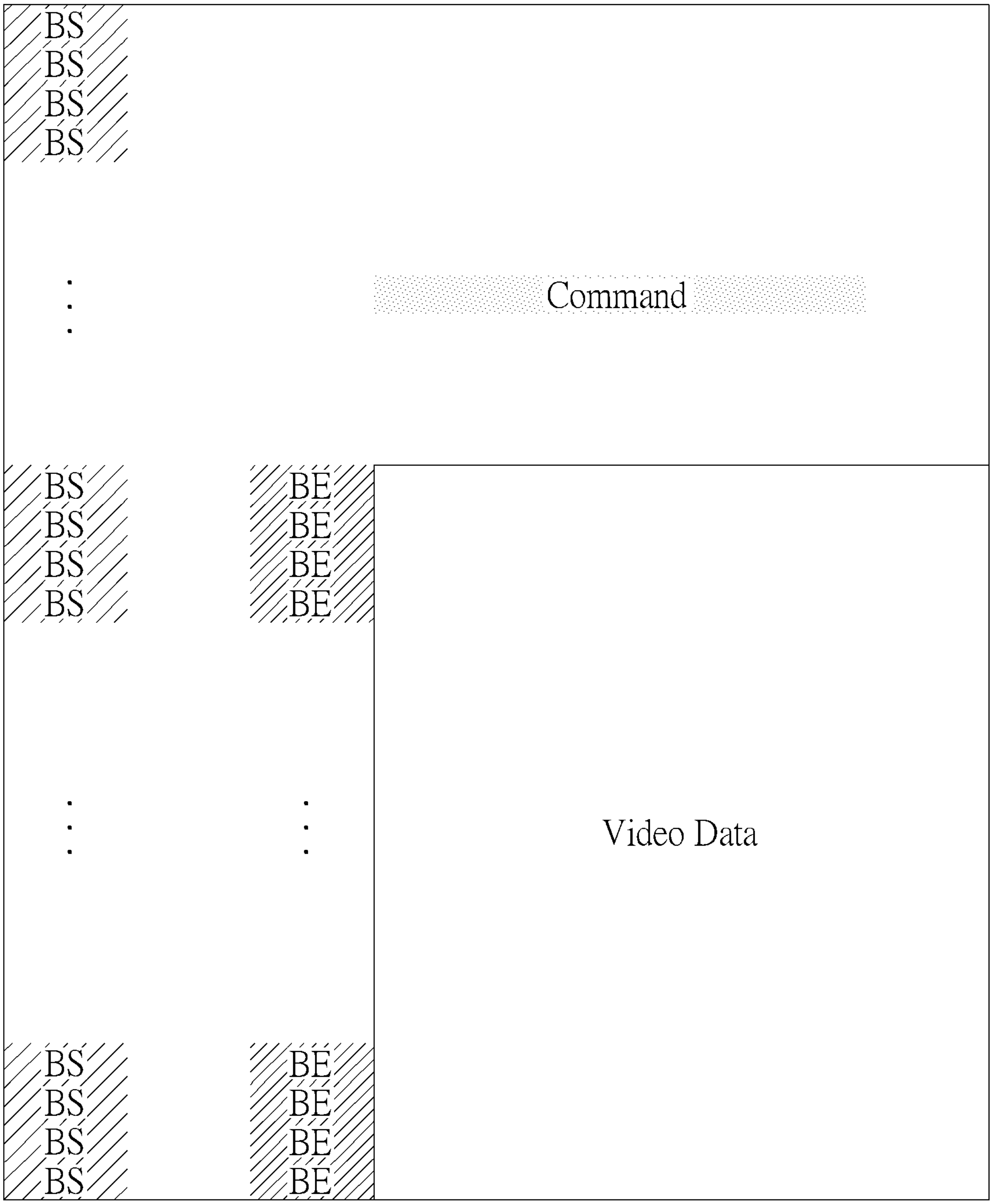
FIG. 1 is a schematic diagram of a typical packet format of the eDP/DP interface.

FIG. 1 is a schematic diagram of a typical packet format of the embedded display port or display port (eDP/DP) interface. As shown in FIG. 1, the timing of an eDP/DP packet is defined by using blanking start (BS) signals and blanking end (BE) signals. Each BS signal is used to indicate a line time. Several prior line times are blanking lines which may be empty or used to send commands, and these line times are defined as a porch. In the porch period, only the BS signals and several commands are transmitted, and there are no BE signals. The video data are sent after the end of the porch period. In the data transmission period, each line time starts with a BS signal, which is followed by a BE signal, and then a line of video data is transmitted. The data transmission period ends when a frame of video data is completely transmitted.

In the Mobile Industry Processor Interface (MIPI), the timing is defined by transmitting the vertical synchronization signal and the horizontal synchronization signal, and thus the display driver circuit may easily be aware of the start and end of each frame data. In contrast, in the eDP/DP packet, the timing is only defined by using the BS and BE signals, and the display driver circuit may not know when the porch will end and the video data will start to be delivered. Therefore, under the situation where the display driver circuit is configured to drive a light-emitting diode (LED) panel such as an organic LED (OLED) panel, if the frame rate is variable, the length of the porch period in the eDP/DP packet may be variable; hence, the display driver circuit is requested to well handle the data transmission and also handle the emission control under irregular arrival of video data.

Figure 2:
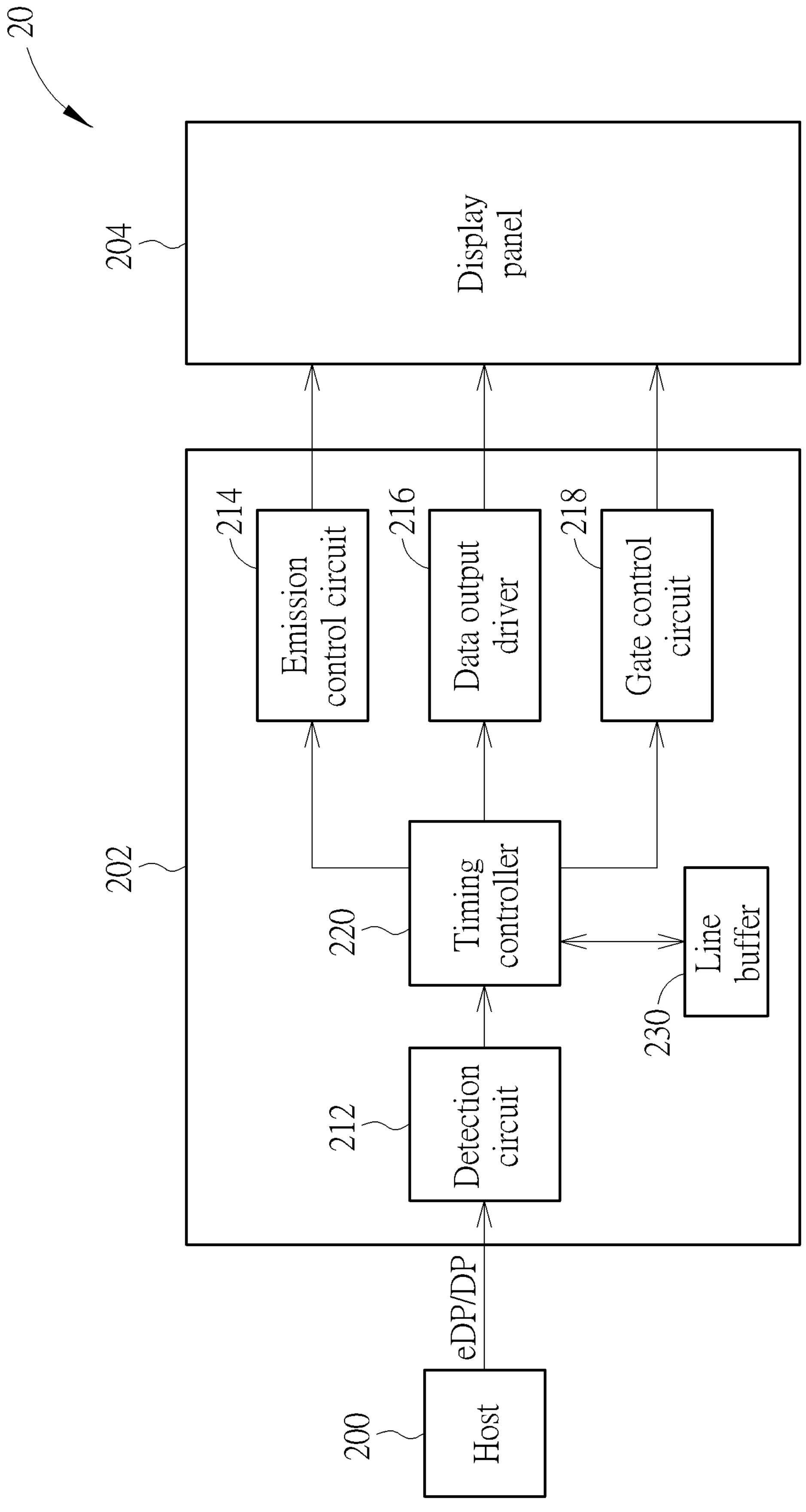
FIG. 2 is a schematic diagram of a display system according to an embodiment of the present invention.

FIG. 2 is a schematic diagram of a display system 20 according to an embodiment of the present invention. The display system 20 includes a host 200, a display driver circuit 202 and a display panel 204. The host 200 may serve as a video provider, for generating video/image content and outputting video data to the display driver circuit 202. The host 200 may be, but not limited to, a system on chip (SoC) or any other main processing circuit implemented with an operating system (e.g., android) in which various applications can be installed. The display panel 204 may be an OLED panel, mini-LED panel, micro-LED panel, or the like, of which light emission is realized by using light-emitting elements included in the pixels.

The display driver circuit 202 includes a detection circuit 212, an emission control circuit 214, a data output driver 216, a gate control circuit 218, a timing controller 220, and one or more line buffers 230. The detection circuit 212 is configured to detect and determine whether there is any video data received at a predetermined time. In an embodiment, the detection circuit 212 may include a receiver or may be implemented with a receiver, which may be an eDP/DP receiver for receiving input video data from the host 200 through the eDP/DP interface. The emission control circuit 214 is configured to output emission control signals such as an emission pulse signal and an emission control clock. These emission control signals may be sent to a gate-on-array (GOA) circuit (not shown) of the display panel 204, to realize the emission control. The gate control circuit 218 is configured to output gate control signals such as a gate pulse signal and a gate control clock. These gate control signals may also be sent to the GOA circuit. The data output driver 216, also called source driver, is configured to output video data voltages to target pixels of the display panel 204. The timing controller 220 is configured to control the timing of outputting the emission/gate control signals and the data voltages based on the reception of the input video data. The line buffer (s) 230 are configured to store the received video data before the video data are output. The display driver circuit 202 may be realized as an integrated circuit (IC) implemented in a chip, and will be called a display driver integrated circuit (DDIC) hereinafter.

Figure 3A:
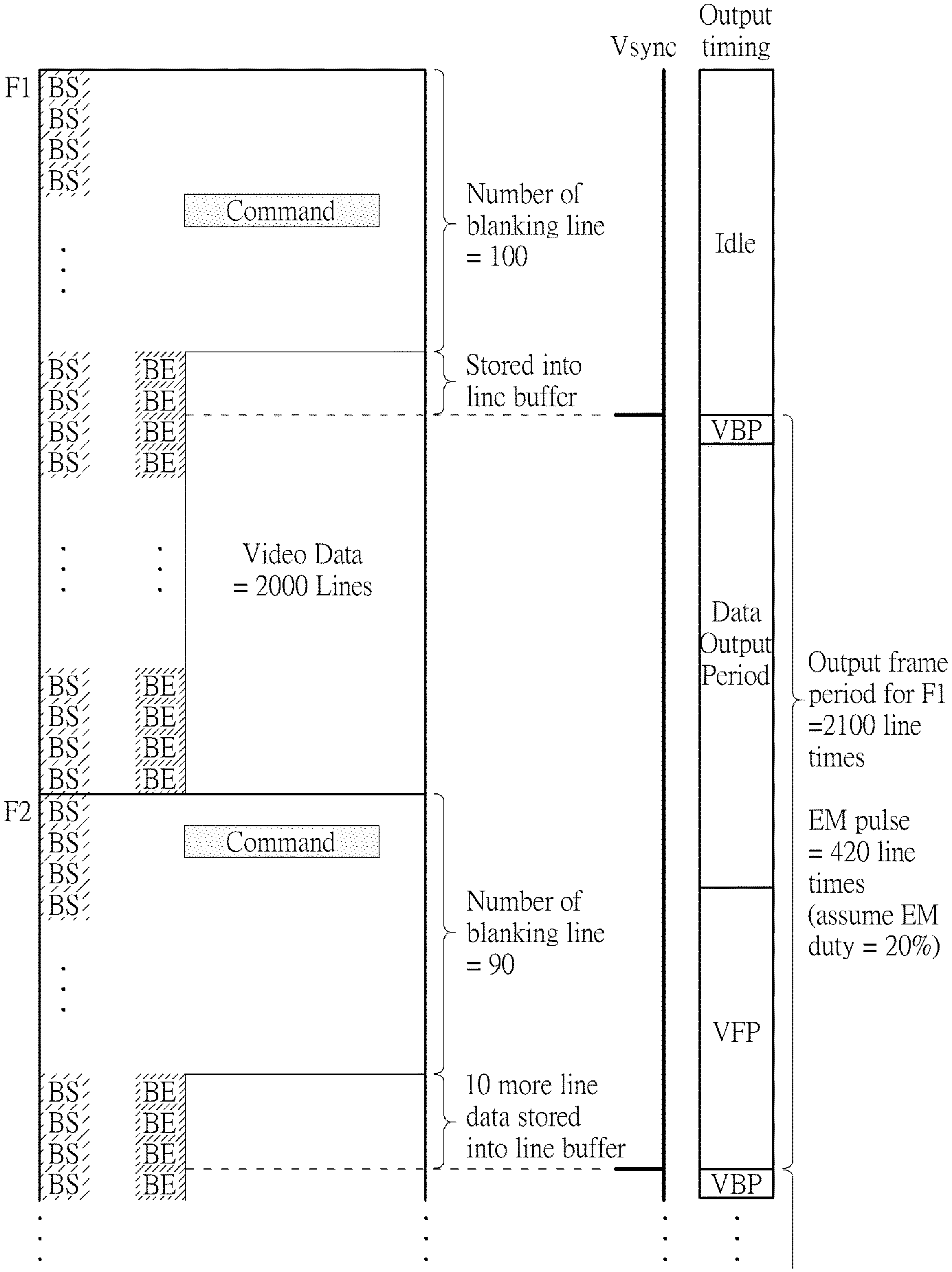
FIGS. 3A and 3B are timing diagrams of an operation of the DDIC.
Figure 3B:
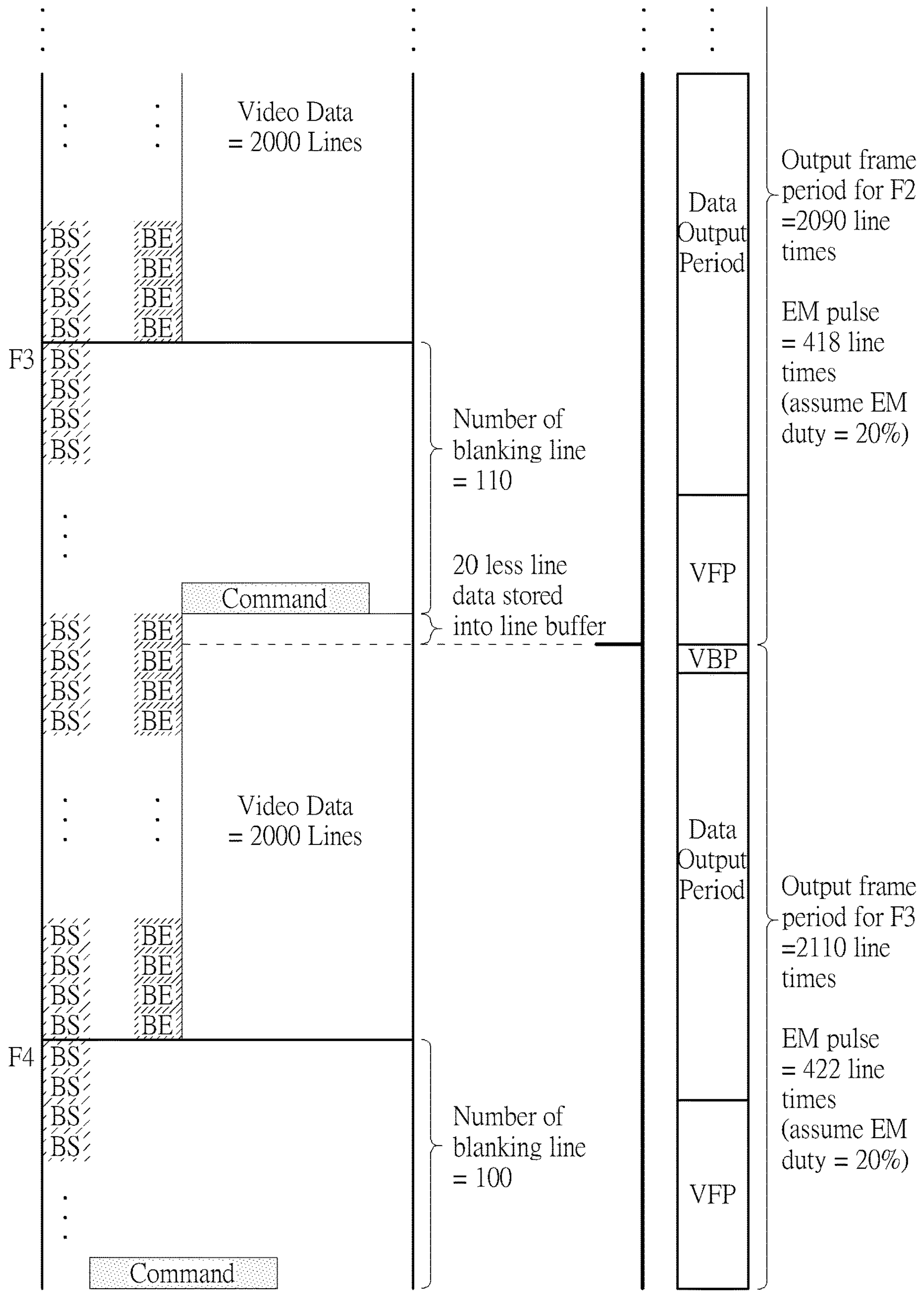

FIGS. 3A and 3B are timing diagrams of an operation of the DDIC 202, where the input video data, a vertical synchronization signal Vsync and the output timing of video data are illustrated. The DDIC 202 may receive a series of frames (F1, F2, F3 . . . , etc.) of video data from the host 200, and refreshes the display panel 204 by outputting the video data. The received frames of video data follow the packet format of the eDP/DP interface, as the eDP/DP packet shown in FIG. 1.

The vertical synchronization signal Vsync includes a plurality of pulses, each of which indicates the start of an output frame period, which is used to output a frame of video data. Note that the eDP/DP interface may not carry a synchronization signal, and this vertical synchronization signal Vsync is an internal signal generated by the DDIC 202 based on the input video data. In an embodiment, the timing controller 220 is configured to generate the vertical synchronization signal Vsync, which is used to define the internal timing for controlling the emission/gate control signals and the data voltages to be output on appropriate time. The output frame period is composed of a Vertical Back Porch (VBP), a data output period, and a Vertical Front Porch (VFP), where the DDIC 202 refreshes the display panel 204 by outputting the video data in the data output period.

In the frame F1, there are 100 blanking lines where no video data are transmitted, which are followed by a frame of video data. The DDIC 202 may detect if there is any command carried in these blanking lines. Subsequently, when detecting a BS signal and a corresponding BE signal, the DDIC 202 may know that the video data will arrive, and start to receive the video data. At this moment, the timing controller 220 may generate a pulse of the vertical synchronization signal Vsync, which indicates the start of a frame period. The operations of the emission control circuit 214, the data output driver 216 and the gate control circuit 218 will follow the interval timing defined by the vertical synchronization signal Vsync. Note that the DDIC 202 requires a processing time for generating the vertical synchronization signal Vsync and allocating the VBP. Therefore, several video data received prior to the vertical synchronization signal Vsync are stored in the line buffers 230. The DDIC 202 then starts to refresh the display panel 204 at the start of the data output period.

In this embodiment, it is supposed that each frame includes 2000 lines of video data. During the data output period, the DDIC 202 outputs the video data from the line buffers 230 while stores the newly received video data into the line buffers 230 according to the first-in-first-out principle.

After the 2000 lines of video data in the frame F1 are completely received, the DDIC 202 may start to receive the second frame F2, which includes 90 blanking lines and 2000 data lines. At this moment, the output frame period enters the VFP after the video data in the frame F1 are completely output. However, the DDIC 202 may not know the total number of blanking lines in the second frame F2 until it receives the BE signal indicating the arrival of video data. The emission control should be based on the current video frame. More specifically, the output frame period for outputting the frame data of F1 may be determined to equal 2100 line times, which is the summation of 100 blanking lines and 2000 data lines in the frame F1. Assuming that the emission (EM) duty cycle is 208, the emission pulse width in the output frame period for the frame F1 will be equal to 420 line times, as shown in FIG. 3A.

Since there are 90 blanking lines in the second frame F2, which is fewer than the number of blanking lines, 100, in the first frame F1. Therefore, after the video data of the frame F2 starts to be received, the output frame period for the second frame F2 (as indicated by the pulse of the vertical synchronization signal Vsync) requires a delay of 10 line times, to be adapted to the decreased blanking lines. In such a situation, there are 10 more line data stored into the line buffers 230 as compared to the number of line data buffered in the line buffers 230 in the previous frame, i.e., F1.

Similarly, the length of the output frame period for the frame F2 is determined based on the summation of the blanking lines and data lines in the frame F2, and equal to 2090 line times. In order to keep the brightness constant, the emission duty cycle is still 20%, and the emission pulse width in this output frame period will be equal to 418 line times.

The DDIC 202 then starts to receive the third frame F3, which includes 110 blanking lines, which is more than the number of blanking lines, 90, in the second frame F2. Therefore, after the video data of the frame F3 starts to be received, the output frame period for the third frame F3 (as indicated by the pulse of the vertical synchronization signal Vsync) starts with a smaller delay with respect to the arrival of the video data of the frame F3. In such a situation, there are less line data stored into the line buffers 230 (20 less line data as compared to the number of line data buffered in the line buffers 230 in the previous frame, i.e., F2).

Similarly, the length of the output frame period for the frame F3 is determined based on the summation of the blanking lines and data lines in the frame F3, and equal to 2110 line times. In order to keep the brightness constant, the emission duty cycle is still 20%, and the emission pulse in this output frame period will be equal to 422 line times.

Based on the above control method, the DDIC 202 may handle the refreshing of the display panel 204 and well control the emission duty cycle to be constant under a variable frame rate, where certain line buffers 230 are required to queue the input video data before they are forwarded to the display panel 204. However, since the frame rate is not fixed, the arrival time of the next frame of video data is usually unpredictable. If the variation of delay time exceeds a tolerance such that the video data do not arrive in time to successfully generate the output video data, the DDIC 202 cannot store the new video data into the line buffers 230, and has to refresh the display panel 204 with old video data or other available data, which might result in abnormal display. In order to solve this problem, the conventional method applies a larger line buffer or even a frame buffer capable of storing more line data, but the larger memory space is accompanied by larger areas and higher costs. From another perspective, the memory space of the deployed line/frame buffers is limited, such that an extremely large variation of arrival time still cannot be well handled by using the line/frame buffers unless the allocated memory space reaches an extremely large capacity.

The present invention provides a novel control method without the usage of large memory space, where the emission duty cycle may be well controlled to reduce the side effect on the displayed video when the variation of arrival time of the input video is quite large. In an embodiment, after the previous frame of video data is completely received, the detection circuit 212 of the DDIC 202 may determine whether the upcoming frame of video data is received at a predetermined time. If the upcoming frame of video data is received at or before the predetermined time, which means that the delay time of this frame data can be handled by using the available line buffers 230, the timing scheme shown in FIGS. 3A and 3B may be feasible. Otherwise, if the upcoming frame of video data is not received at the predetermined time, which means that the delay time of the upcoming video data is excessively large such that the DDIC 202 cannot timely refresh the display panel 204 by outputting the newly received video data.

Figure 4A:
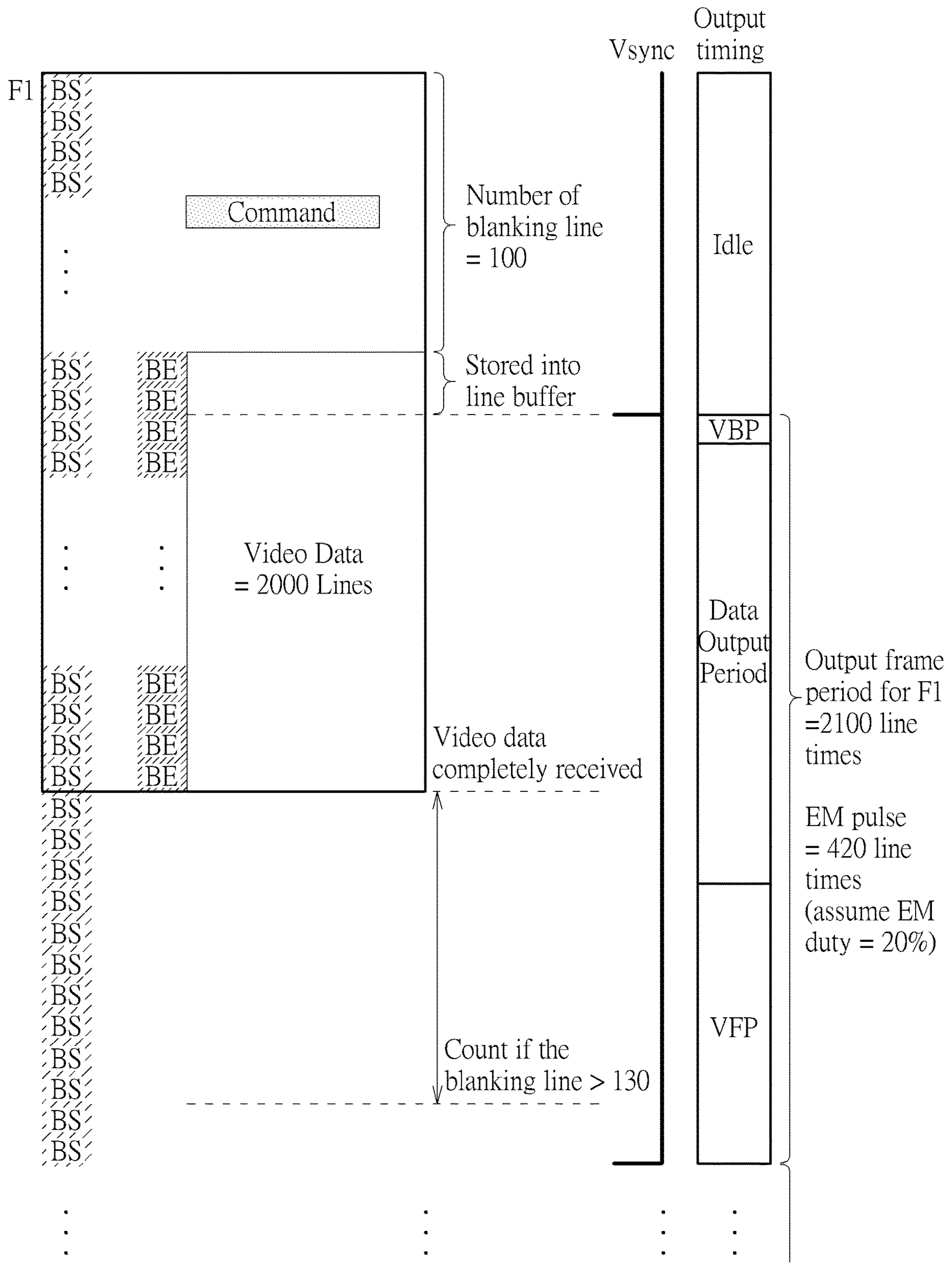
FIGS. 4A and 4B are timing diagrams of an operation of the DDIC according to an embodiment of the present invention.
Figure 4B:
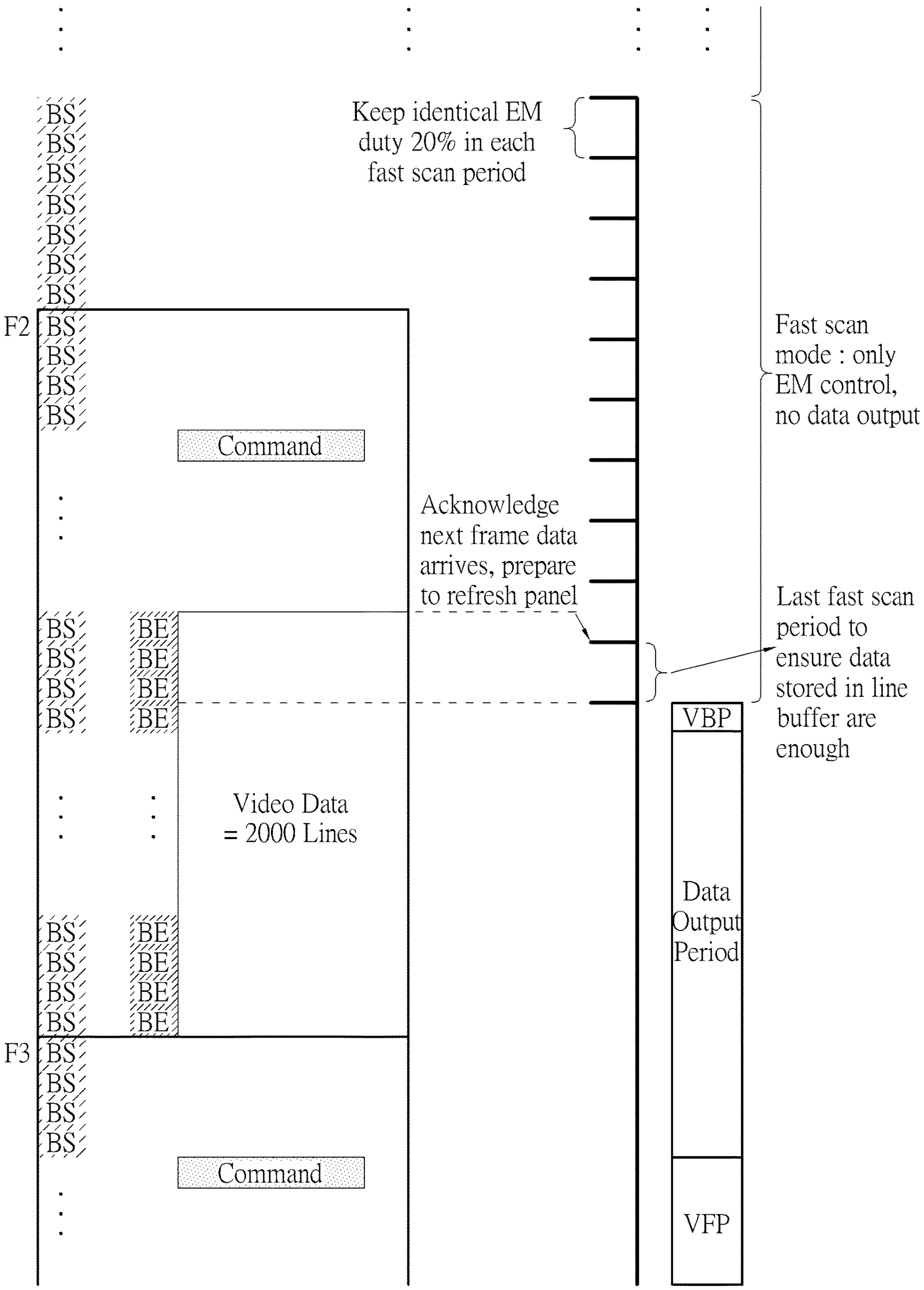

FIGS. 4A and 4B are timing diagrams of an operation of the DDIC 202 according to an embodiment of the present invention. Similar to FIGS. 3A and 3B, FIGS. 4A and 4B also illustrate a series of input frame data arranged as the eDP/DP data format, the vertical synchronization signal Vsync and the output timing of video data. In this embodiment, the number of blanking lines in the frame F1 is 100, and the storage capacity of the line buffers 230 included in the DDIC 202 may allow the reception of at most 130 blanking lines, for example. Subsequently, the video data in the frame F1 are received successfully and then output in the corresponding output frame period. After the last line of video data in the frame F1 is received, the detection circuit 212 may count the line time until reception of the next frame of input video data (i.e., F2). More specifically, the detection circuit 212 may count the line time to determine whether there is an input video data received at a predetermined time point corresponding to 130 blanking lines.

In this embodiment, a BS signal is transmitted at the start of each line time, and thus the detection circuit 212 may count the number of BS signals after reception of the last video data.

In an embodiment, if the DDIC 202 is operated normally where the input video data are timely loaded into the line buffers 230 and the output video data are output from the line buffers 230 according to the first-in-first-out principle, the DDIC 202 may be considered as being operated in a normal scan mode. In the normal scan mode, the vertical synchronization signal Vsync may be used to define an output frame period for outputting a frame of video data. If the detection circuit 212 determines that no input video data is received when the counted line time exceeds a threshold such as 130, the DDIC 202 may enter a fast scan mode. In the fast scan mode, the data output driver 216 may stop outputting the video data, i.e., stop refreshing the display panel 204. Correspondingly, the gate control circuit 218 may stop outputting the gate control signals to the display panel 204.

In order to keep the brightness constant in the fast scan mode, the emission control circuit 214 may still output the emission pulse signals having the same duty cycle as in the previous normal scan mode. Although the data output driver 216 stops outputting the video data, the data voltages may be kept in the storage capacitors of the corresponding pixels for certain frame periods with a tolerable leakage. Therefore, the influence on the displayed video caused by the late refreshing may be minimized.

For example, as shown in FIGS. 4A and 4B, after the video data in the frame F1 is completely received, when the detection circuit 212 determines that the counted blanking line number exceeds a threshold and no video data is received, the DDIC 202 enters the fast scan mode after the end of the output frame period for the frame F1. In the fast scan mode, each pulse of the vertical synchronization signal Vsync generated by the timing controller 220 defines a fast scan period, of which the length is shorter than the length of an output frame period. The length of the fast scan period may be predetermined and have an appropriate value based on the operating speed of the display panel 204. For example, the length of the fast scan period may be determined to be equal to 1/10, 1/25 or 1/100 of the length of the output frame period. Based on the fast scan period, the emission control clock has a higher frequency than in the normal scan mode, and the emission pulse signal has a duty cycle identical to its duty cycle in the last output frame period of the normal scan mode.

The DDIC 202 may be in the fast scan mode if the blanking lines are continuously received, until acknowledging that the next frame of video data arrives. In this embodiment, after receiving a BE signal which indicates an arrival of the video data of the frame F2, the DDIC 202 may prepare to enter the normal scan mode and restart to refresh the display panel 204. More specifically, when the detection circuit 212 detects the arrival of new video data, the DDIC 202 may complete the last fast scan period, or further allocate an additional fast scan period to ensure that there are enough video data stored in the line buffers 230, and then enter the normal scan mode. In the normal scan mode, the vertical synchronization signal Vsync restarts to follow the frame period corresponding to the input video data. The emission pulse signal may keep the same duty cycle, and the emission control clock is output in a lower frequency than in the fast scan period. The DDIC 202 may restart to refresh the display panel 204 with the newly received video data, and also output the corresponding gate control signals.

Figure 5A:
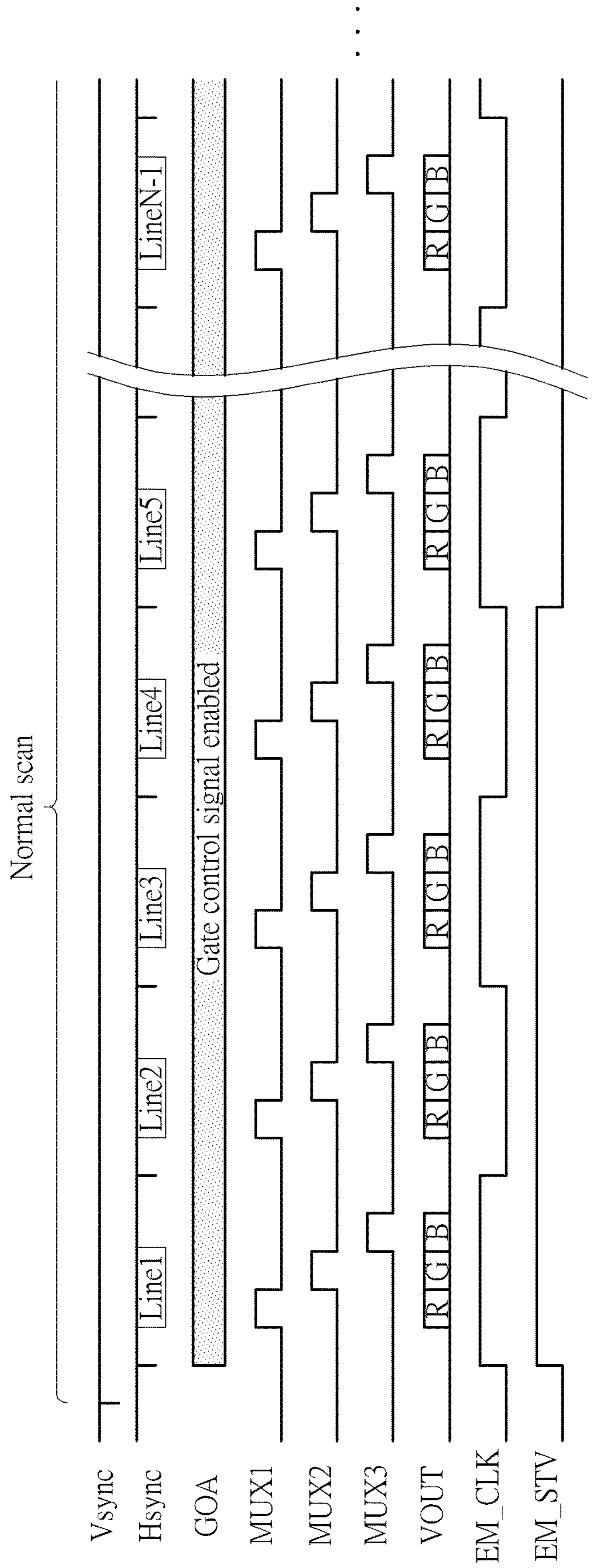
FIGS. 5A and 5B are waveform diagrams of detailed implementations of the DDIC in the normal scan mode and the fast scan mode according to an embodiment of the present invention.
Figure 5B:
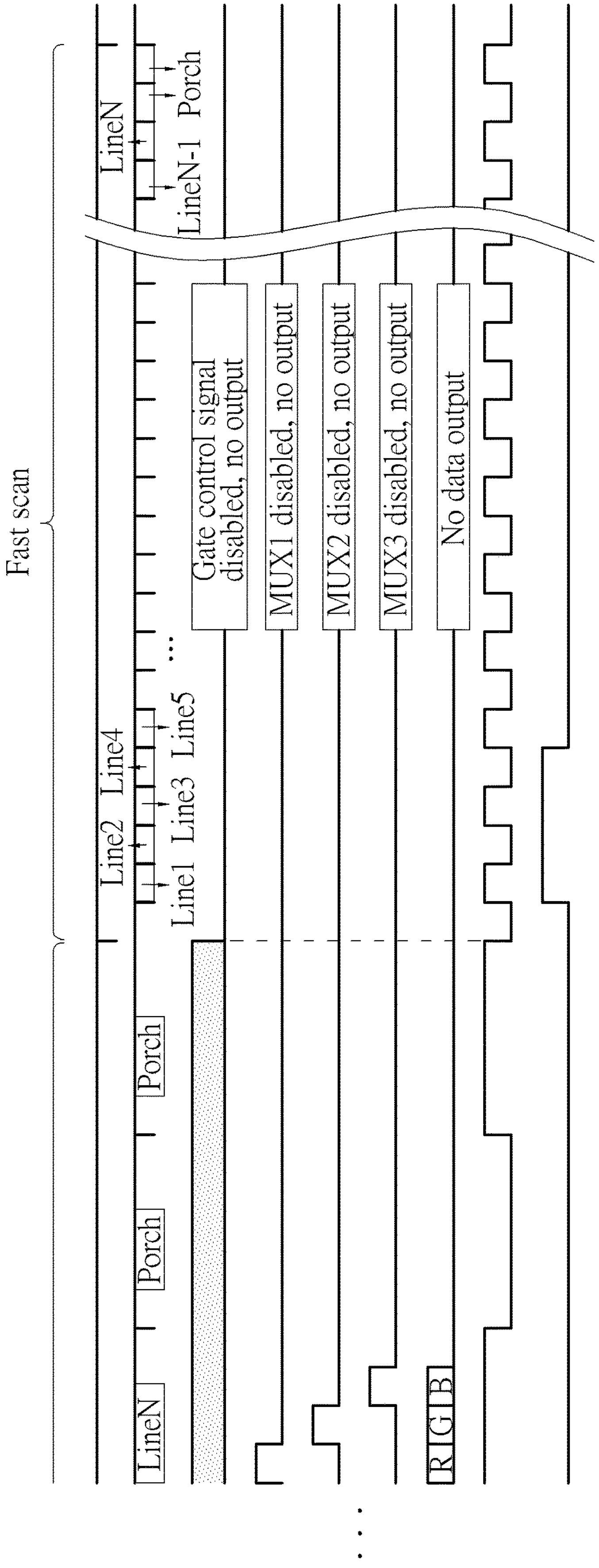

FIGS. 5A and 5B are waveform diagrams of detailed implementations of the DDIC 202 in the normal scan mode and the fast scan mode according to an embodiment of the present invention. FIGS. 5A and 5B illustrate the waveforms of a vertical synchronization signal Vsync, a horizontal synchronization signal Hsync, gate control signals GOA, multiplexer (MUX) control signals MUX1-MUX3, output video data VOUT, an emission control clock EM_CLK, and an emission pulse signal EM_STV. The vertical synchronization signal Vsync and the horizontal synchronization signal Hsync are used to define the timing of the normal scan mode and the fast scan mode. In the normal scan mode, the vertical synchronization signal Vsync and the horizontal synchronization signal Hsync will follow the input frame data, to define an output frame period and a line time, respectively. In the fast scan mode, the vertical synchronization signal Vsync may define a fast scan period which is shorter than the output frame period, and the period length of the horizontal synchronization signal Hsync may also be shortened proportionally. In such a situation, each period defined by a pulse of the vertical synchronization signal Vsync has a fixed number of pulses of the horizontal synchronization signal Hsync. The signals output to the display panel 204 from the DDIC 202 will follow the timing defined by the vertical synchronization signal Vsync and the horizontal synchronization signal Hsync.

In the normal scan mode, the DDIC 202 refreshes the display panel 204 normally. In detail, the output of the gate control signals GOA is enabled. A frame of output video data VOUT (for red, green and blue colors) is output line by line, and the output video data VOUT may be forwarded to the target data lines by sequentially turning on corresponding MUXs of the display panel 204 through the MUX control signals MUX1-MUX3. The MUX control signals MUX1-MUX3 are merely an exemplary implementation for illustrating the MUX control. In fact, there may be 6, 8 or any number of MUXs coupled to hundreds or thousands of data lines on the display panel 204. The emission control clock EM_CLK is toggled following the line time defined by the horizontal synchronization signal Hsync. Note that the emission control clock EM_CLK may be output with any appropriate frequency, and the implementation should not be limited to that shown in FIGS. 5A and 5B. The emission pulse signal EM_STV may have a predetermined duty cycle to determine the overall brightness. In this embodiment, the duty cycle is defined by a light-on ratio equal to 4/N, where the emission pulse signal EM_STV has a pulse of which the width is equal to 4 line times (among the N line times in this frame).

As shown in FIG. 5B, the porch of the output frame period is followed by a fast scan period in which the DDIC 202 enters the fast scan mode. In the fast scan mode, each pulse of the horizontal synchronization signal Hsync defines a shortened line time. In order to keep the brightness constant, the emission pulse signal EM_STV may also have a pulse of which the width is equal to 4 shortened line times, to achieve the same light-on ratio 4/N, which is equivalently the same duty cycle.

Figure 6:
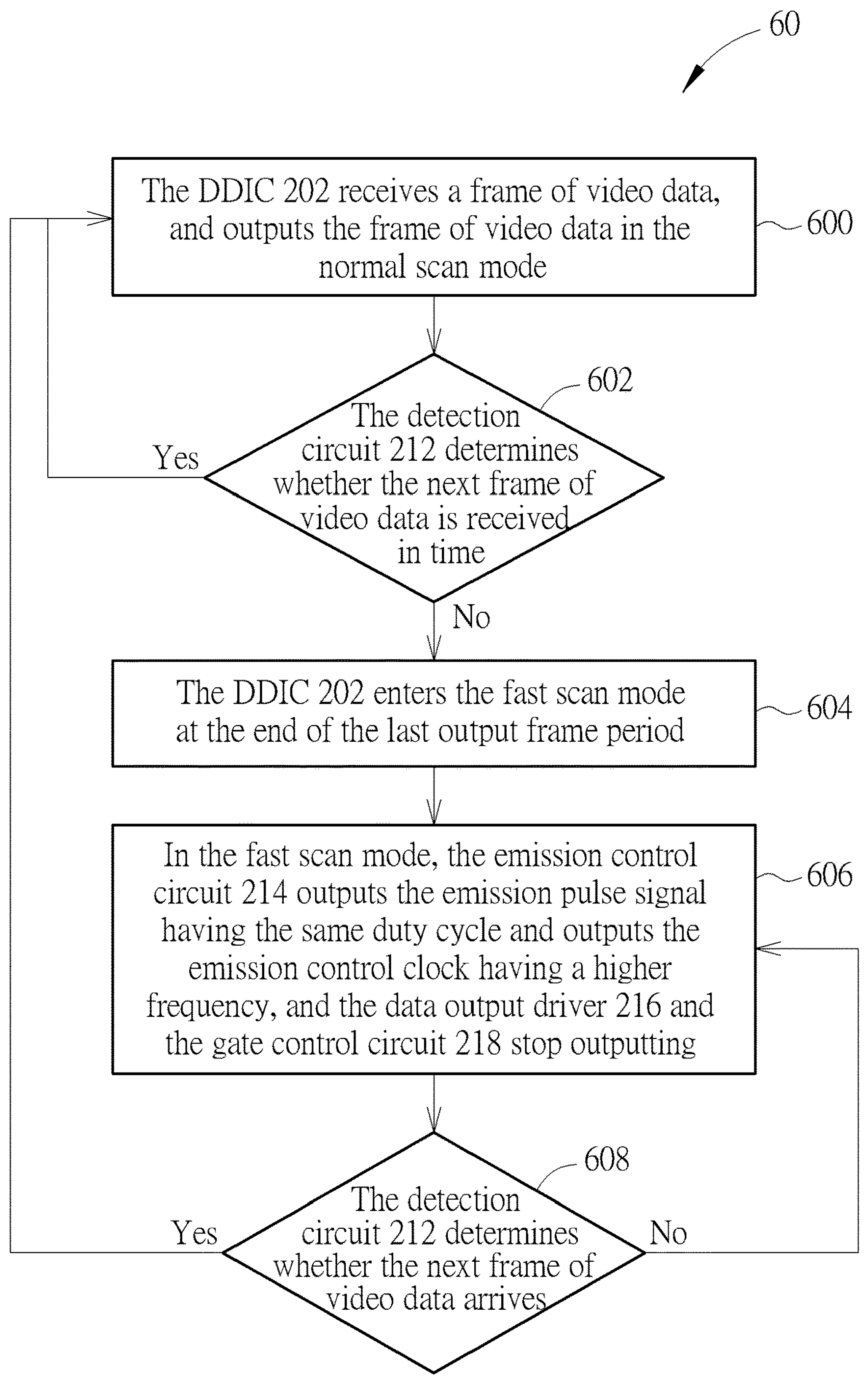
FIG. 6 is a flowchart of a process according to an embodiment of the present invention.

FIG. 6 is a flowchart of a process 60 according to an embodiment of the present invention. The process 60 may be implemented in a display driver circuit for controlling an LED panel, such as the DDIC 202 shown in FIG. 2. As shown in FIG. 6, the process 60 includes the following steps:

Step 600: The DDIC 202 receives a frame of video data, and outputs the frame of video data in the normal scan mode.

Step 602: The detection circuit 212 determines whether the next frame of video data is received in time. If yes, go to Step 600; otherwise, go to Step 604.

Step 604: The DDIC 202 enters the fast scan mode at the end of the last output frame period.

Step 606: In the fast scan mode, the emission control circuit 214 outputs the emission pulse signal having the same duty cycle and outputs the emission control clock having a higher frequency, and the data output driver 216 and the gate control circuit 218 stop outputting.

Step 608: The detection circuit 212 determines whether the next frame of video data arrives. If yes, go to Step 600; otherwise, go to Step 606.

The detailed operations and alterations of the process 60 are illustrated in the above paragraphs, and will not be repeated herein.

Please note that the present invention aims at providing a novel method for controlling an LED panel by receiving input video data through the eDP/DP interface. Those skilled in the art may make modifications and alterations accordingly. For example, in the above embodiments, the host 200 continuously outputs the BS signals in the blanking interval, and the BS signals may serve as a reference for the DDIC 202 to count the line times. In another embodiment, there is no BS signal sent in the blanking interval, and the DDIC 202 should determine the arrival of next frame data by itself.

Figure 7A:
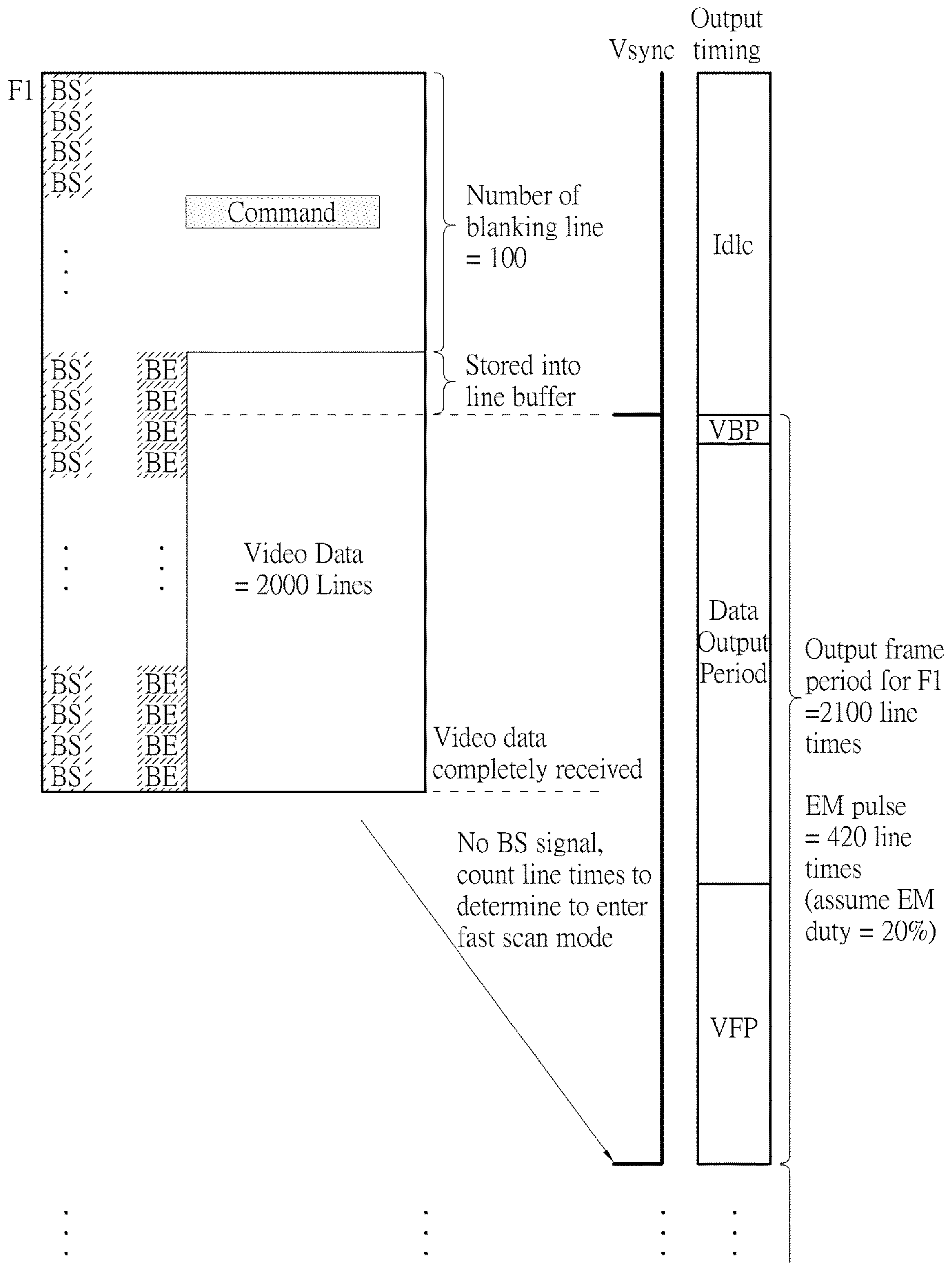
FIGS. 7A and 7B are timing diagrams of an operation of the DDIC according to an embodiment of the present invention.
Figure 7B:
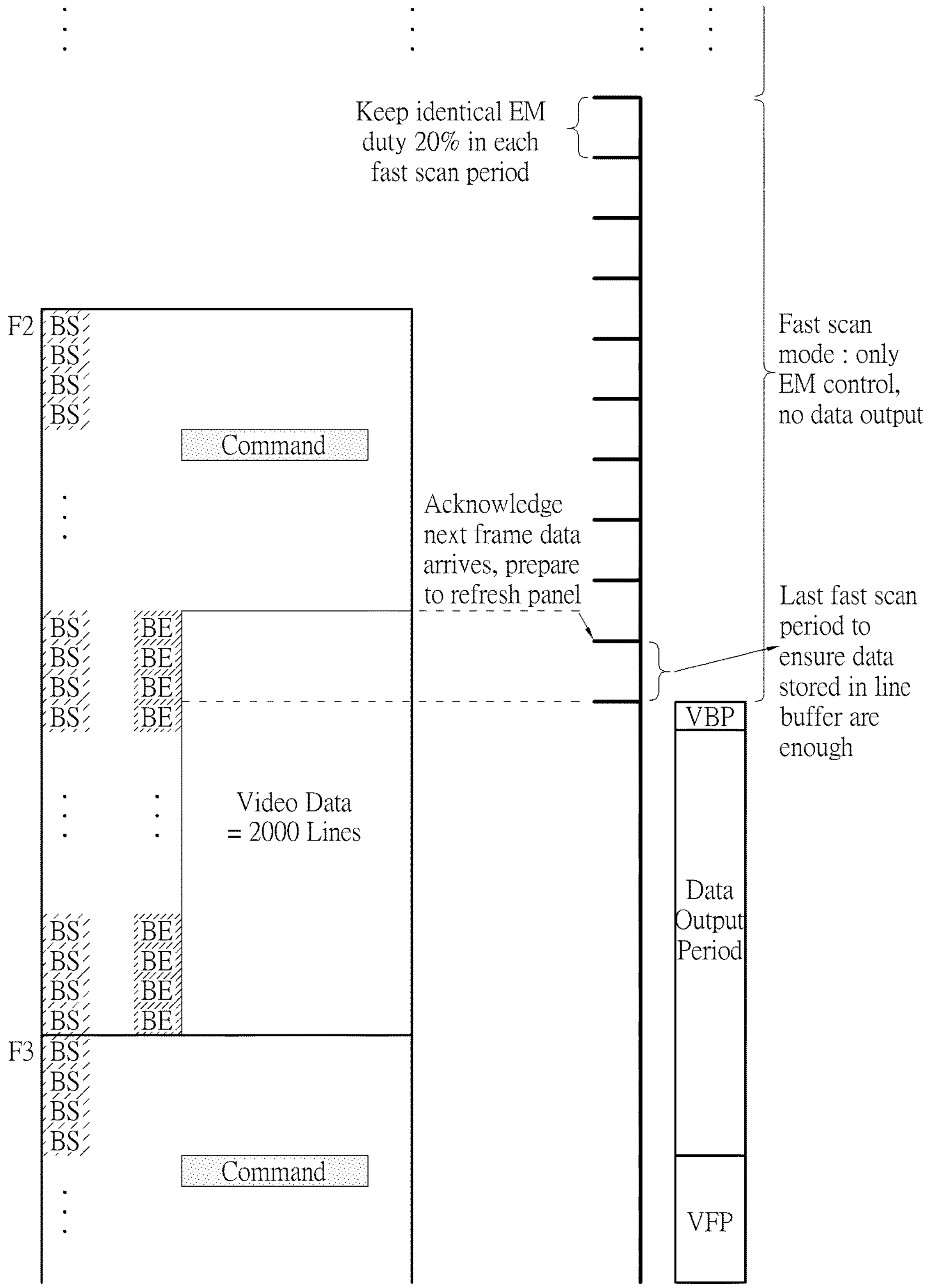

FIGS. 7A and 7B are timing diagrams of an operation of the DDIC 202 according to an embodiment of the present invention. In the timing diagram shown in FIGS. 7A and 7B, there is no BS signal received in the blanking interval between the frames F1 and F2, and thus the DDIC 202 cannot determine the line times by counting the number of BS signals. Instead, based on the video data and related BE/BS signals received in the previous frame F1, the line time length is known information, which allows the DDIC 202 to count the line times through an internal clock, e.g., a horizontal synchronization signal produced by the timing controller 220. The DDIC 202 may still enter the fast scan mode if the counted line time number exceeds a threshold which may be beyond a tolerance based on the storage capacity of the line buffers 230.

To sum up, the present invention provides a method for controlling an LED panel by receiving input video data through the eDP/DP interface and a related control circuit such as a DDIC. The DDIC may be operated in a normal scan mode when the input video data are received normally, where the input video data are queued in line buffer (s) and then the output video data from the line buffer (s) are output to the display panel. Due to the variable frame rate, each frame of video data may arrive with different delays. If the next frame data is not received at a predetermined time, the DDIC may enter a fast scan mode, where the emission control clock has a higher frequency than in the normal scan mode, and the emission pulse signal keeps the same duty cycle to make the brightness constant. In an embodiment, the vertical and horizontal synchronization signals in the fast scan mode may toggle in higher frequencies than in the normal scan mode, to control the output timing of the emission control signals. Meanwhile, the outputs of the video data and related gate control signals are stopped, and thus the displayed video is kept by using the data voltages stored in the pixels. Therefore, the DDIC only needs a few line buffers, the emission and brightness of the LED panel may be well controlled without degrading the display quality under a variable frame rate.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method used for a control circuit, for controlling a display panel, the method comprising:

determining whether there is an input video data received at a predetermined time;

outputting an output video data and a clock signal having a first frequency to the display panel when determining that there is an input video data received at the predetermined time; and stopping outputting the output video data but outputting the clock signal having a second frequency to the display panel when determining that there is no input video data received at the predetermined time;

wherein the second frequency is higher than the first frequency.

2. The method of claim 1, further comprising:

outputting an emission pulse signal having a first duty cycle to the display panel in an output frame period for outputting a frame of video data; and outputting the emission pulse signal having a second duty cycle to the display panel in a time period right after the output frame period when determining that there is no input video data received at the predetermined time;

wherein the second duty cycle is substantially equal to the first duty cycle.

3. The method of claim 1, further comprising:

outputting a gate control signal to the display panel when determining that there is an input video data received at the predetermined time; and stopping outputting the gate control signal to the display panel when determining that there is no input video data received at the predetermined time.

4. The method of claim 1, wherein the step of determining whether there is an input video data received at the predetermined time comprises:

counting a line time after reception of a last input video data, to determine whether there is an input video data received at the predetermined time.

5. The method of claim 4, wherein the step of counting the line time after reception of the last input video data comprises:

counting a number of blanking start signals received after the reception of the last input video data.

6. The method of claim 4, wherein the step of counting the line time after reception of the last input video data to determine whether there is an input video data received at the predetermined time comprises:

determining that there is no input video data received at the predetermined time when no input video data is received after the counted line time exceeds a threshold which is determined according to a line buffer.

7. The method of claim 1, wherein the control circuit is in a normal scan mode when determining that there is an input video data received at the predetermined time, and in a fast scan mode when determining that there is no input video data received at the predetermined time, and the method further comprises:

generating a vertical synchronization signal to define an output frame period according to the input video data when the control circuit is in the normal scan mode; and generating the vertical synchronization signal to define a fast scan period in the fast scan mode;

wherein a length of the fast scan period is shorter than a length of the output frame period.

8. The method of claim 1, wherein the control circuit is in a fast scan mode, and the method further comprises:

entering a normal scan mode and restarting to output the output video data after receiving a blanking end signal which indicates an arrival of the input video data.

9. The method of claim 1, further comprising:

receiving the input video data through a display port (DP) interface or an embedded display port (eDP) interface.

10. A control circuit for controlling a display panel, comprising:

a detection circuit, configured to determine whether there is an input video data received at a predetermined time;

a data output driver, coupled to the detection circuit, configured to output an output video data to the display panel when the detection circuit determines that there is an input video data received at the predetermined time, and stop outputting the output video data when the detection circuit determines that there is no input video data received at the predetermined time; and an emission control circuit, coupled to the detection circuit, configured to output a clock signal having a first frequency to the display panel when the detection circuit determines that there is an input video data received at the predetermined time, and output the clock signal having a second frequency to the display panel when the detection circuit determines that there is no input video data received at the predetermined time;

wherein the second frequency is higher than the first frequency.

11. The control circuit of claim 10, wherein the emission control circuit is further configured to:

output an emission pulse signal having a first duty cycle to the display panel in an output frame period for outputting a frame of video data; and output the emission pulse signal having a second duty cycle to the display panel in a time period right after the output frame period when the detection circuit determines that there is no input video data received at the predetermined time;

wherein the second duty cycle is substantially equal to the first duty cycle.

12. The control circuit of claim 10, further comprising a gate control circuit which is configured to:

output a gate control signal to the display panel when the detection circuit determines that there is an input video data received at the predetermined time; and stop outputting the gate control signal to the display panel when the detection circuit determines that there is no input video data received at the predetermined time.

13. The control circuit of claim 10, wherein the detection circuit is further configured to count a line time after reception of a last input video data, to determine whether there is an input video data received at the predetermined time.

14. The control circuit of claim 13, wherein the detection circuit is further configured to count a number of blanking start signals received after the reception of the last input video data, to count the line time.

15. The control circuit of claim 13, further comprising a line buffer, wherein the detection circuit is further configured to determine that there is no input video data received at the predetermined time when no input video data is received after the counted line time exceeds a threshold which is determined according to the line buffer.

16. The control circuit of claim 10, wherein the control circuit is in a normal scan mode when the detection circuit determines that there is an input video data received at the predetermined time, and in a fast scan mode when the detection circuit determines that there is no input video data received at the predetermined time, and the control circuit further comprises:

a timing controller, configured to:

generate a vertical synchronization signal to define an output frame period according to the input video data when the control circuit is in the normal scan mode; and generate the vertical synchronization signal to define a fast scan period in the fast scan mode;

wherein a length of the fast scan period is shorter than a length of the output frame period.

17. The control circuit of claim 10, wherein the control circuit is in a fast scan mode, and the control circuit enters a normal scan mode and the data output driver restarts to output the output video data after the control circuit receives a blanking end signal which indicates an arrival of the input video data.

18. The control circuit of claim 10, further configured to receive the input video data through a display port (DP) interface or an embedded display port (eDP) interface.

19. A method used for a control circuit, for controlling a display panel, the method comprising:

receiving a first frame of video data;

outputting the first frame of video data with an emission pulse signal having a first duty cycle to the display panel;

determining whether a second frame of video data is received at a predetermined time after the first frame of video data is completely received; and outputting the emission pulse signal having the first duty cycle to the display panel without outputting any video data when determining that the second frame of video data is not received at the predetermined time.

20. The method of claim 19, further comprising:

outputting an emission control clock having a first frequency to the display panel for the first frame of video data; and outputting the emission control clock having a second frequency to the display panel when determining that the second frame of video data is not received at the predetermined time;

wherein the second frequency is higher than the first frequency.

21. The method of claim 19, further comprising:

outputting a gate control signal to the display panel when determining that the second frame of video data is received at the predetermined time; and stopping outputting the gate control signal to the display panel when determining that the second frame of video data is not received at the predetermined time.

22. The method of claim 19, wherein the step of determining whether the second frame of video data is received at the predetermined time comprises:

counting a line time after reception of the first frame of video data, to determine whether the second frame of video data is received at the predetermined time.

23. The method of claim 22, wherein the step of counting the line time after reception of the first frame of video data comprises:

counting a number of blanking start signals received after the reception of the first frame of video data.

24. The method of claim 22, wherein the step of counting the line time after reception of the first frame of video data to determine whether the second frame of video data is received at the predetermined time comprises:

determining that the second frame of video data is not received at the predetermined time when no video data is received after the counted line time exceeds a threshold which is determined according to a line buffer.

25. The method of claim 19, wherein the control circuit is in a normal scan mode when determining that the second frame of video data is received at the predetermined time, and in a fast scan mode when determining that the second frame of video data is not received at the predetermined time, and the method further comprises:

generating a vertical synchronization signal to define an output frame period according to the second frame of video data when the control circuit is in the normal scan mode; and generating the vertical synchronization signal to define a fast scan period in the fast scan mode;

wherein a length of the fast scan period is shorter than a length of the output frame period.

26. The method of claim 19, wherein the control circuit is in a fast scan mode, and the method further comprises:

entering a normal scan mode and restarting to output an output video data after receiving a blanking end signal which indicates an arrival of a third frame of video data.

27. The method of claim 19, further comprising:

receiving the first frame of video data through a display port (DP) interface or an embedded display port (eDP) interface.

28. A control circuit for controlling a display panel, comprising:

a detection circuit, configured to receive a first frame of video data and determine whether a second frame of video data is received at a predetermined time after the first frame of video data is completely received;

a data output driver, coupled to the detection circuit, configured to output the first frame of video data to the display panel; and an emission control circuit, coupled to the detection circuit, configured to output an emission pulse signal having a first duty cycle to the display panel;

wherein the emission control circuit is further configured to output the emission pulse signal having the first duty cycle and the data output driver is further configured to not output any video data when the detection circuit determines that the second frame of video data is not received at the predetermined time.

29. The control circuit of claim 28, wherein the emission control circuit is further configured to:

output an emission control clock having a first frequency to the display panel for the first frame of video data; and output the emission control clock having a second frequency to the display panel when the detection circuit determines that the second frame of video data is not received at the predetermined time;

wherein the second frequency is higher than the first frequency.

30. The control circuit of claim 28, further comprising a gate control circuit which is configured to:

output a gate control signal to the display panel when the detection circuit determines that the second frame of video data is received at the predetermined time; and stop outputting the gate control signal to the display panel when the detection circuit determines that the second frame of video data is not received at the predetermined time.

31. The control circuit of claim 28, wherein the detection circuit is further configured to count a line time after reception of the first frame of video data, to determine whether the second frame of video data is received at the predetermined time.

32. The control circuit of claim 31, wherein the detection circuit is further configured to count a number of blanking start signals received after the reception of the first frame of video data, to count the line time.

33. The control circuit of claim 31, further comprising a line buffer, wherein the detection circuit is further configured to determine that the second frame of video data is not received at the predetermined time when no video data is received after the counted line time exceeds a threshold which is determined according to the line buffer.

34. The control circuit of claim 28, wherein the control circuit is in a normal scan mode when the detection circuit determines that the second frame of video data is received at the predetermined time, and in a fast scan mode when the detection circuit determines that the second frame of video data is not received at the predetermined time, and the control circuit further comprises:

a timing controller, configured to:

generate a vertical synchronization signal to define an output frame period according to the second frame of video data when the control circuit is in the normal scan mode; and generate the vertical synchronization signal to define a fast scan period in the fast scan mode;

wherein a length of the fast scan period is shorter than a length of the output frame period.

35. The control circuit of claim 28, wherein the control circuit is in a fast scan mode, and the control circuit enters a normal scan mode and the data output driver restarts to output an output video data after the control circuit receives a blanking end signal which indicates an arrival of a third frame of video data.

36. The control circuit of claim 28, further configured to receive the first frame of video data through a display port (DP) interface or an embedded display port (eDP) interface.

* * * * *